Feb. 24, 1942.  E. SCHWARZ  2,274,096
PRESSED TUBULAR GLASS STRUCTURE
Filed Feb. 13, 1939
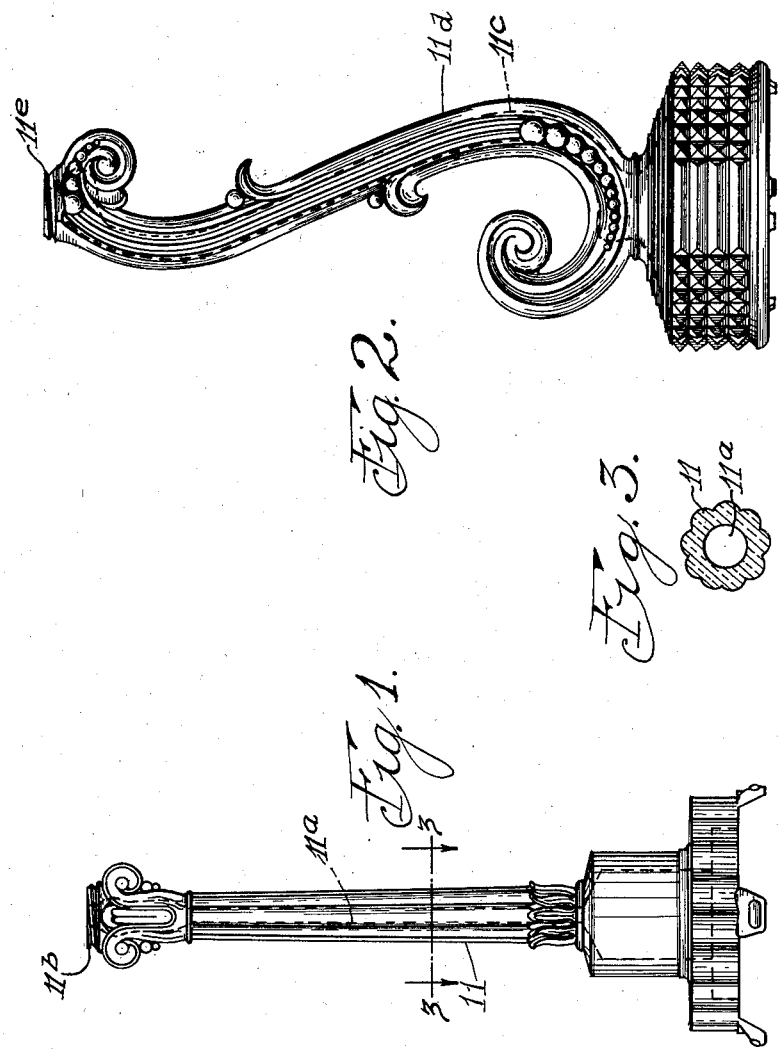
INVENTOR.
EUGENE SCHWARZ
BY Albert E. Bell
ATTORNEY.

Patented Feb. 24, 1942

2,274,096

UNITED STATES PATENT OFFICE 2,274,096

PRESSED TUBULAR GLASS STRUCTURE

Eugene Schwarz, Alexandria, Ind., assignor to The Mantle Lamp Company of America, Chicago, Ill., a corporation of Illinois Application February 13, 1939, Serial No. 256,046

4 Claims. (Cl. 248—158)

My invention relates to pressed glassware made by my improved process by which a carefully determined quantity of molten glass is placed in a mold and pressed against the surface of the mold by the insertion of a plunger part way into one end of the mold, said plunger being of such dimensions as to press the glass in the mold against its entire surface, and after the glass engaging the mold surface has set, the still fluent central or axial portion of the glass between the end of the plunger and the other end of the mold, is expelled and blown out from the molded and set glass structure by gas under pressure, said gas being preferably introduced through the plunger, said other end of the mold being open at the time, to permit the expelling operation. The process described may be used effectively where it is desirable to make as integral structures, molded glass pedestals and slender columns for any purpose, for example, for use as electric lamp standards, the result with such lamp structures being that the hollow columns serve as conductor passageways for containing electric conductors extending from within the bases, through the columns of the lamps to the sockets thereof.

My improved process has the advantage of producing any desired conformation of hollow glass structure, corresponding to the mold conformation, so that any desired ornamentation may be employed that will permit the mold to be opened and the glass structure removed therefrom, and at the same time the entire glass structure is unitary from end to end and may with glass lamps or glass lamp standards, include in any case, a hollow base, a tubular spindle or standard, and a threaded upper end portion to receive a fitting to support the lamp socket.

My process referred to is operative as a result of the chilling or setting of the exterior portion of the glass in the mold, resulting from contact between the glass and the mold due to the pressing of the glass into the mold by the plunger. At the same time, although the exterior portion of the glass structure has set sufficiently to possess considerable stability, the central axial portion of the glass structure in the mold is still much hotter and sufficiently fluent to respond to the gas admitted axially under pressure against the glass in the mold, as a result of which the central axial portion of the glass that is fluent, is expelled or blown from the remaining portion of the glass structure, leaving the glass structure with a central longitudinal passageway of substantial diameter extending from end to end of the glass structure. At the same time, the gas under pressure in many cases operates during the expelling operation to more intimately press the exterior portion of the glass structure against the mold surface, depending upon the instant of admitting the gas under pressure to the mold. The time of admitting the gas under pressure into the mold, is determined by the thickness of glass wall which it is desired for the finished glass structure to have, as well as by the melting temperature of the glass, the temperature of the mold, the time required for the particular glass to set, and the particular kind of glass used in any case, as a result of which it is impossible to state generally, how long the glass should be in contact with the mold before the gas pressure is applied. It will also be understood that the size of the glass article to be made in the mold has much to do with the time of chilling or setting before the gas under pressure is supplied to the mold; in some cases where a relatively large glass article is desired to have relatively thin walls, the gas under pressure is applied promptly after the pressing operation, whereas with the same glass article, if it is desired to have a relatively thick wall, the chilling or setting operation is permitted to proceed for a corresponding length of time, before admitting the gas under pressure to the mold.

The above and other objects of my invention will more fully appear by reference to the accompanying drawing illustrating a preferred embodiment thereof, in which—

Fig. 1 shows in front elevation, a glass lamp stand having a straight column, produced by my process, Fig. 2 shows in front elevation, a glass lamp stand having a curved column, produced by my process, and Fig. 3 is a horizontal sectional view to an enlarged scale, of the structure shown in Fig. 1, taken along the line 3—3.

Similar numerals refer to similar parts throughout the several views.

In Fig. 1 I illustrate an article of pressed glassware 11, made by the process above generally described, and provided with an axial blown passageway 11a extending from an under surface of the base portion of the article, to and through the upper end of the article. The article so shown while specifically intended for use as an electric lamp stand, is illustrative of any article of pressed glassware having a straight tubular column or stem and an integral base. In Fig. 2 I similarly illustrate an article of pressed glassware lid made by said process, and having a curved column or stem of any desired form and curvature susceptible of being produced as described, and extending upwardly from a supporting base, a blown passageway 11c in which extends from an under surface of the base to and through the upper end of the column or stem. This structure is illustrative generally of any article of pressed glassware having a tubular column or stem of any desired curvature and ornamentation. The passageway in the column or stem may in either case be of a cross-section of substantially the size required to accommodate electric conductors for lamp connecting purposes.

In making slender, tubular glass structures of the class referred to, I am able to produce such integral structures having a length of 18 inches or more, and an external diameter of about 5/8 inch, and by the blowing operation I am able to produce a passageway through the slender spindle portion of the structure of about 1/4 to 3/8 inch in diameter. I am also able to make similar integral and tubular structures having external diameters of from 3/4 inch to 1 inch, which are from 25 inches to 40 inches long. It will be observed that by my invention, integral tubular glass articles of the kind described may be cheaply produced.

It will be understood that my invention includes any integral molded glass structures having slender and long stems or standards provided with axial central passageways resulting from the molding and forming of the glass articles as described.

It will be noted that in the finished article, the glass surface film of the passageway produced as described, is continuous and unbroken, that the glass surface film of the adjacent portion of the base is also continuous and unbroken and in the condition produced by the plunger, and that said surface films merge one into the other, whereby the strength of the glass is not impaired. This condition is indicated by dotted lines in Figs. 1 and 2.

In Fig. 1, I show a lamp stand 11, having a straight column, made as above described, and having an axial passageway extending through its column, made by expelling by gas under pressure, the central axial and fluent portion of the column from the set outer portion thereof, which passageway connects the hollow in the base, with the upper end of the lamp stand. In Fig. 2, I show a similar lamp stand 11d, having a curved column, made in the same manner as the lamp stand shown in Fig. 1, which also has a central passageway extending longitudinally through it from the hollow in its base to the upper end of the lamp stand, and made in the same manner as the passageway through the column of the lamp stand shown in Fig. 1. In Figs. 1 and 2 the upper ends of the columns as shown are provided respectively with molded attachment threads 11b and 11e to receive lamp socket fittings.

While I have shown my invention in the particular embodiment above described, I do not limit myself to the particular constructions illustrated and described, as I may include equivalents thereof without departing from the scope of the appended claims.

What I claim is:

1. A molded integral lamp stand of glass including a press-molded hollow base and a slender column extending from said base, said hollow base having molded inner and outer surfaces and having a larger lateral dimension internally than the external diameter of said column, said base having side and top walls and being open at its lower end, and said column having a passageway blown therein of a cross-section sufficient to accommodate electric conductors, said passageway extending through said column and also extending through an under surface of said base, the surface of said passageway and said under surface being continuous and merging one into the other and resulting from the solidifying of the glass, whereby the strength of the glass is not impaired.

2. A molded integral lamp stand of glass including a press-molded hollow base and a slender column extending from said base, said hollow base having molded inner and outer surfaces and having a larger lateral dimension internally than the external diameter of said column, said base having side and top walls and being open at its lower end, and said column having a passageway blown therein of a cross-section sufficient to accommodate electric conductors, said passageway extending through an under surface of said base, the surface of said passageway and said under surface being continuous and merging one into the other and resulting from the solidifying of the glass, whereby the strength of the glass is not impaired, said column being curved as it extends from said base.

3. A molded integral lamp stand of glass including a press-molded hollow base and a slender column extending from said base, said hollow base having molded inner and outer surfaces and having a larger lateral dimension internally than the external diameter of said column, said base having side and top walls and being open at its lower end, and said column having a passageway blown therein of a cross-section sufficient to accommodate electric conductors, said passageway extending through an under surface of said base, the surface of said passageway and said under surface being continuous and merging one into the other and resulting from the solidifying of the glass, whereby the strength of the glass is not impaired, said column having molded attachment threads at its end remote from said base.

4. A pressed integral stand of glass including a pressed base and a column extending from said base, said stand having a passageway blown in said column and extending from an under surface of the base to and through the top of the column, the surface film of said passageway and the film of said under surface being continuous and merging one into the other and resulting from the solidifying of the glass, whereby the strength of the glass is not impaired, said passageway being of a cross-section limited substantially to the size required to accommodate electric conductors for lamp connecting purposes.

EUGENE SCHWARZ.